April 23, 1929.  E. ALLEN  1,710,563
CLEANER OR WIPER FOR METER GLASSES
Filed July 5, 1928
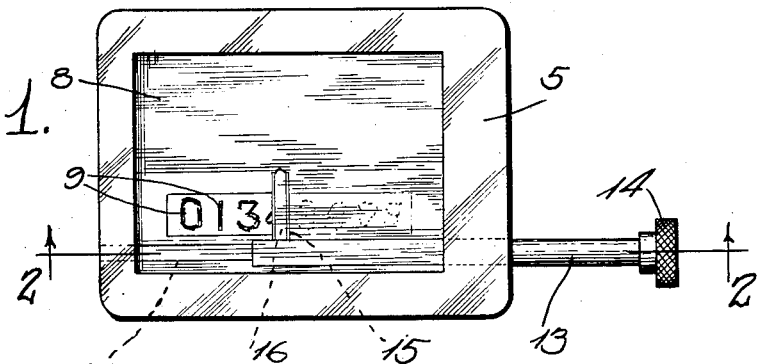
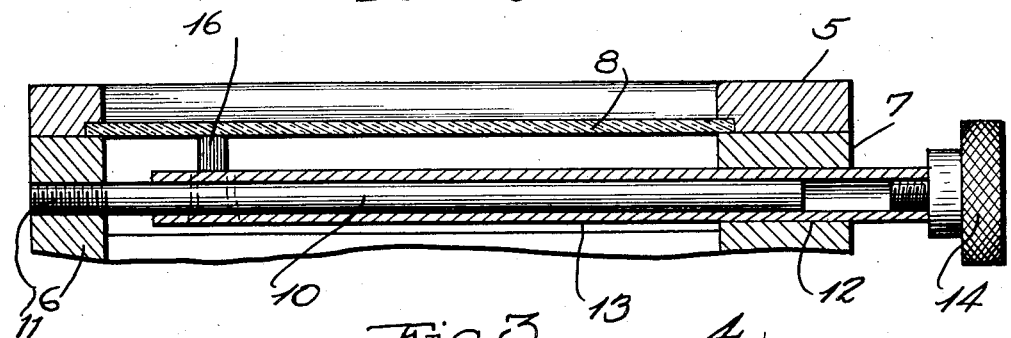
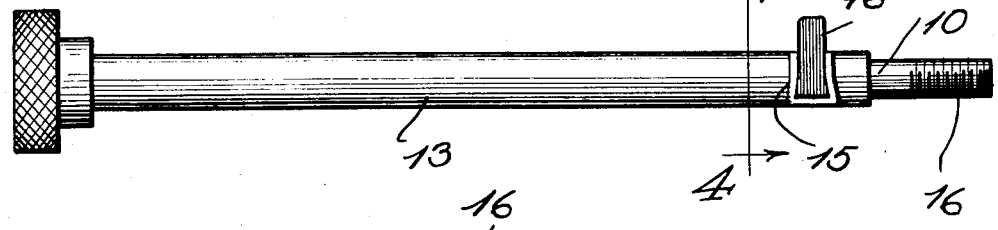
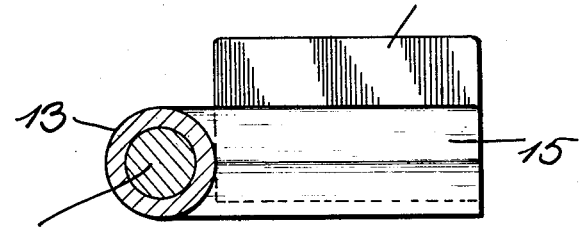
INVENTOR.
Elmer Allen.
BY Bryant & Lowry
ATTORNEYS Patented Apr. 23, 1929.

1,710,563

UNITED STATES PATENT OFFICE.

ELMER ALLEN, OF GEORGETOWN, KENTUCKY.

CLEANER OR WIPER FOR METER GLASSES.

Application filed July 5, 1928. Serial No. 290,601.

This invention relates to certain new and useful improvements in cleaners or wipers for meter glasses and has particular reference to a wiper in the form of a squeegee positioned interiorly of a meter casing with the operating handle therefor positioned exteriorly of the casing and adapted to be shifted for moving the wiper or squeegee over the inner face of the meter glass to remove dirt and condensation from the inner side of the glass aligned with the window through which the dial of the meter is readable.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a front elevational view of a meter casing equipped with the cleaner or squeegee for cleaning the inner side of the glass cover for the meter, the glass cover being illustrated with a portion thereof cleaned to permit a clear reading of the meter through the glass cover;

Figure 2 is a horizontal sectional view taken on line 2—2 of Figure 1 showing the guide rod in the meter casing for the manually reciprocable tube that carries the squeegee;

Figure 3 is a side elevational view of the cleaner device detached from the meter casing; and Figure 4 is a detail sectional view taken on line 4—4 of Figure 3.

Referring more in detail to the accompanying drawing, there is illustrated a meter casing 5 having end walls 6 and 7 with the open front side thereof closed by the glass cover 8 held in position by an enclosing frame. The meter casing may contain mechanism appropriate to a water, gas, electric or other indicating device wherein characters 9 are viewable through the cover glass 8. In devices of this character, condensation and other foreign matter collect upon the inner face of the glass cover 8 and interfere with the correct reading of the meter, and the primary object of this invention is to provide a cleaner or squeegee to be manually shifted over the inner face of the glass cover 8 in line with the register reading or meter characters 9 to obtain a clear reading thereof.

The cleaner device is in the form of a squeegee comprising a guide rod 10 extending horizontally across the casing 5 with one end 11 thereof threaded into the end wall 6 of the casing while the other end of the guide rod 10 extends into the opening 12 of a larger diameter formed in the end wall 7. The rod 10 is enclosed by a tube 13 that is freely slidable thereon with the outer end of the tube 13 passing through the wall opening 12 and having a cap nut 14 threadably engaged therewith to constitute an operating handle. A squeegee is carried by the inner end of the tube 13 and includes a U-shaped clamp 15 projecting laterally from the tube 13 with a rubber strip or squeegee 16 set therein as illustrated and in a position to wipe over the inner face of the glass cover 8.

From the above detailed description of the device, it is believed that the construction and operation thereof will at once be apparent, it being noted that the squeegee strip 16 wipes over the inner face of the glass cover 8 when the tube 13 is reciprocated or moved inwardly and outwardly of the casing 5 for the purpose of cleaning the inner face of the glass, as illustrated in Figure 1, the squeegee in said figure being illustrated in a position as having partially cleaned a section of the glass cover plate to permit the correct reading of the meter figures, while an unclean section of the glass cover is illustrated and discloses the obscurity of the meter figures when the glass cover is unclean and covered with condensation or other foreign matter.

While there is herein shown and described the preferred embodiment of the present invention, it is nevertheless to be understood that minor changes may be made therein without departing from the spirit and scope of the invention as claimed.

What I claim as new is:—

1. In a cleaner for meters having casings with glass covers, a cleaner element associated with the inner face of the glass cover and comprising a guide rod anchored at one end in the meter casing, the opposite end of the casing having an opening therein alined with the rod, a tube reciprocable on the rod and extending through the casing opening, a handle on the outer end of the tube, and a squeegee on the inner end of the tube contacting with the inner face of the glass cover.

2. In a cleaner for meters having casings with glass covers, a cleaner element associated with the inner face of the glass cover and comprising a guide rod anchored at one end in the meter casing, the opposite end of the casing having an opening therein alined with the rod, a tube reciprocable on the rod and extending through the casing opening, a handle on the outer end of the tube, and a squeegee arm extending laterally of the inner end of the tube and contacting with the inner face of the glass cover.

In testimony whereof I affix my signature.

ELMER ALLEN.